United States Patent
Warner et al.

(10) Patent No.: US 7,957,868 B2
(45) Date of Patent: Jun. 7, 2011

(54) ELECTRONIC POWER MODULE FOR AN AGRICULTURAL VEHICLE

(75) Inventors: Terry R. Warner, Davenport, IA (US); Michael R. Moody, Moline, IA (US); Aaron M. Senneff, LeClaire, IA (US); Mark D. Anderson, Dubuque, IA (US)

(73) Assignee: Deere & Company, Moline, IL (US)

( * ) Notice: Subject to any disclaimer, the term of this patent is extended or adjusted under 35 U.S.C. 154(b) by 553 days.

(21) Appl. No.: 12/134,829

(22) Filed: Jun. 6, 2008

(65) Prior Publication Data
US 2008/0306663 A1   Dec. 11, 2008

Related U.S. Application Data

(60) Provisional application No. 60/942,280, filed on Jun. 6, 2007.

(51) Int. Cl.
*B60W 30/00* (2006.01)
(52) U.S. Cl. ............................................. 701/50; 701/36
(58) Field of Classification Search ......................... None
See application file for complete search history.

(56) References Cited

U.S. PATENT DOCUMENTS

| | | | | |
|---|---|---|---|---|
| 6,230,089 | B1 * | 5/2001 | Lonn et al. | 701/48 |
| 6,496,885 | B1 * | 12/2002 | Smart et al. | 710/100 |
| 6,665,601 | B1 * | 12/2003 | Nielsen | 701/50 |
| 6,907,331 | B2 * | 6/2005 | Paquet | 701/36 |
| 7,337,343 | B2 * | 2/2008 | Barrenscheen et al. | 713/340 |
| 7,539,888 | B2 * | 5/2009 | Hu et al. | 713/324 |

* cited by examiner

*Primary Examiner* — Michael J. Zanelli

(57) ABSTRACT

An electronic power module (EPM) for an agricultural vehicle is provided. The EPM is configurable by an electronic control unit (ECU) to which it is connected by way of a controller area network (CAN) bus. The CAN bus network includes a plurality of electronic control unit (ECU)s and a plurality of EPMs, wherein each of the EPMs is coupled to a corresponding ECU of the plurality of ECUs to be controlled thereby. Each EPM includes an EPM circuit having at least one microcontroller, a driver circuit and a CAN bus communication circuit. The driver circuit is coupled to the microcontroller and is configured by the microcontroller. The driver circuit has a plurality of driver subcircuits. The CAN bus communication circuit is coupled to the microcontroller configured to receive CAN bus messages that include driver configuration instructions and driver current limits from a corresponding ECU and instructions to the microcontroller. The microcontroller receives the driver configuration instructions from the CAN bus communications circuit and responsively configures the driver subcircuits according to the driver configuration instructions.

12 Claims, 3 Drawing Sheets

ELECTRONIC POWER MODULE FOR AN AGRICULTURAL VEHICLE

This is a non-provisional application based upon U.S. provisional patent application Ser. No. 60/942,280, entitled "ELECTRONIC POWER MODULE FOR AN AGRICULTURAL VEHICLE", filed Jun. 6, 2007, which is incorporated herein by reference.

FIELD OF THE INVENTION

The invention relates to electrical power distribution devices for motor vehicles.

BACKGROUND OF THE INVENTION

Increasingly, motor vehicles such as trucks, cars, construction vehicles and agricultural vehicles are using distributed networks of digital electronic controllers to monitor and control the operation of the vehicle. One of the most common networks used are Controller Area Network (CAN) bus networks defined by the SAE J1939 standard. These networks have gradually replaced the large all-analog wire looms that extended through vehicles in the past.

These networks have eliminated some of the vehicle wiring, but other wiring, particularly the power lines necessary to carry power to individual devices throughout the vehicle are still commonly used.

What is needed is a power module for providing power to electrical components throughout the vehicle. What is also needed is a power module that is capable of being automatically configured for use in a variety of locations in a vehicle just as a traditional fuse is configured to be used in a variety of different circuits in a vehicle.

It is an object of this invention to provide such an electronic power module. It is also an object of this invention to provide a vehicle network configured to use such an electronic power module.

SUMMARY OF THE INVENTION

In accordance with a first aspect of the invention, an Electronic Power Module (EPM) for an agricultural vehicle having a CAN bus network is provided, wherein the CAN bus network includes a plurality of Electronic Control Units (ECUs) and a plurality of the EPMs, wherein each of the EPMs is coupled to a corresponding ECU of the plurality of ECUs to be controlled thereby, and further wherein each EPM of the plurality of EPMs includes, (1) a housing; (2) at least one multipin connector on the housing (3) an EPM circuit disposed in the housing and further including (a) at least one microcontroller; (b) a driver circuit coupled to the at least one microcontroller to be configured thereby, the driver circuit having a plurality of driver subcircuits; and (c) a CAN bus communication circuit coupled to the at least one microcontroller to receive CAN bus messages that include driver configuration instructions and driver current limits from the corresponding ECU and to provide the instruction to the at least one microcontroller; (d) wherein the at least one microcontroller is configured to receive the driver configuration instructions from the CAN bus communications circuit and to responsively configure the driver subcircuits according to those driver configuration instructions.

The at least one microcontroller may be configured to receive CAN bus messages from the CAN bus communications circuit including instructions to selectively and independently configure each of the plurality of subcircuits as an H-bridge, a current sourcing or a current sinking outputs, and further wherein the at least one microcontroller is configured to configure each of the plurality of subcircuits accordingly. The at least one microcontroller may be configured to receive CAN bus messages from the corresponding ECU including current limits for each of the driver subcircuits, and further wherein the microcontroller is configured (1) to monitor each of the driver subcircuits to determine whether each of the driver subcircuits has exceeded its associated current limit, and (2) to responsively shut each of the driver subcircuits down when the associated current limit for the corresponding driver subcircuits is exceeded. The at least one multipin connector may include a plurality of address pins that are configured to automatically indicate a CAN bus address to the EPM when the multipin connector is plugged in to the vehicle's wiring harness. The at least one microcontroller may be configured to receive CAN bus messages from the CAN bus communications circuit including a total current limit for the sum of the individual currents passing through the plurality of driver subcircuits, and further wherein the microcontroller is configured (1) to monitor the plurality of driver subcircuits to determine whether the total current of the plurality of driver subcircuits exceeds the total current limit, and (2) to responsively shut off the plurality of driver subcircuits when the total current limit is exceeded. The at least one microcontroller may be configured to receive CAN bus messages including instructions to (1) configure a first subcircuit of the plurality of subcircuits as a pulse width modulated circuit, (2) configure the frequency at which the first subcircuit shall be modulated, and (3) configure the pulse width modulated duty cycle of the first subcircuit.

In accordance with a second aspect of the invention, a CAN bus network for an agricultural vehicle is provided, including a plurality of ECU's; a plurality of EPMs, wherein each of the EPM's is coupled to a corresponding ECU of the plurality of ECU's to be controlled thereby, and further wherein each EPM of the plurality of EPM further includes: (1) a housing; (2) at least one multipin connector on the housing (3) an EPM circuit disposed in the housing and further including (a) at least one microcontroller; (b) a driver circuit coupled to the at least one microcontroller to be configured thereby, the driver circuit having a plurality of driver subcircuits; and (c) a CAN bus communication circuit coupled to the at least one microcontroller to receive CAN bus messages including driver configuration instructions and driver current limits from the corresponding ECU and to provide the instruction to the at least one microcontroller; (d) wherein the at least one microcontroller is configured to receive the driver configuration instructions from the CAN bus communications circuit and to responsively configure the driver subcircuits according to those driver configuration instructions.

The at least one microcontroller may be configured to receive CAN bus messages from the CAN bus communications circuit including instructions to selectively and independently configure each of the plurality of subcircuits as an H-bridge, current sourcing or current sinking outputs, and further wherein the at least one microcontroller is configured to configure each of the plurality of subcircuits accordingly. The at least one microcontroller may be configured to receive CAN bus messages from the corresponding ECU including current limits for each of the driver subcircuits, and further wherein the microcontroller is configured (1) to monitor each of the driver subcircuits to determine whether each of the driver subcircuits has exceeded its associated current limit, and (2) to responsively shut each of the driver subcircuits off when the associated current limit for the corresponding driver subcircuit is exceeded. The at least one multipin connector may include a plurality of address pins that are configured to automatically indicate a CAN bus address to the EPM when the multipin connector is plugged in to the vehicle's wiring harness. The at least one microcontroller may be configured to receive CAN bus messages from the CAN bus communications circuit including a total current limit for the sum of the individual currents passing through the plurality of driver subcircuits, and further wherein the microcontroller is configured (1) to monitor the plurality of driver subcircuits to determine whether the total current of the plurality of driver subcircuits exceeds the total current limit, and (2) to responsively shut off the plurality of driver subcircuits when the total current limit is exceeded. The at least one microcontroller may be configured to receive CAN bus messages including instructions to (1) configure a first subcircuit of the plurality of subcircuits as a pulse width modulated circuit, (2) configure the frequency at which the first subcircuit shall be modulated, and (3) configure the pulse width modulated duty cycle of the first subcircuit.

DETAILED DESCRIPTION OF THE INVENTION

Figure 1:
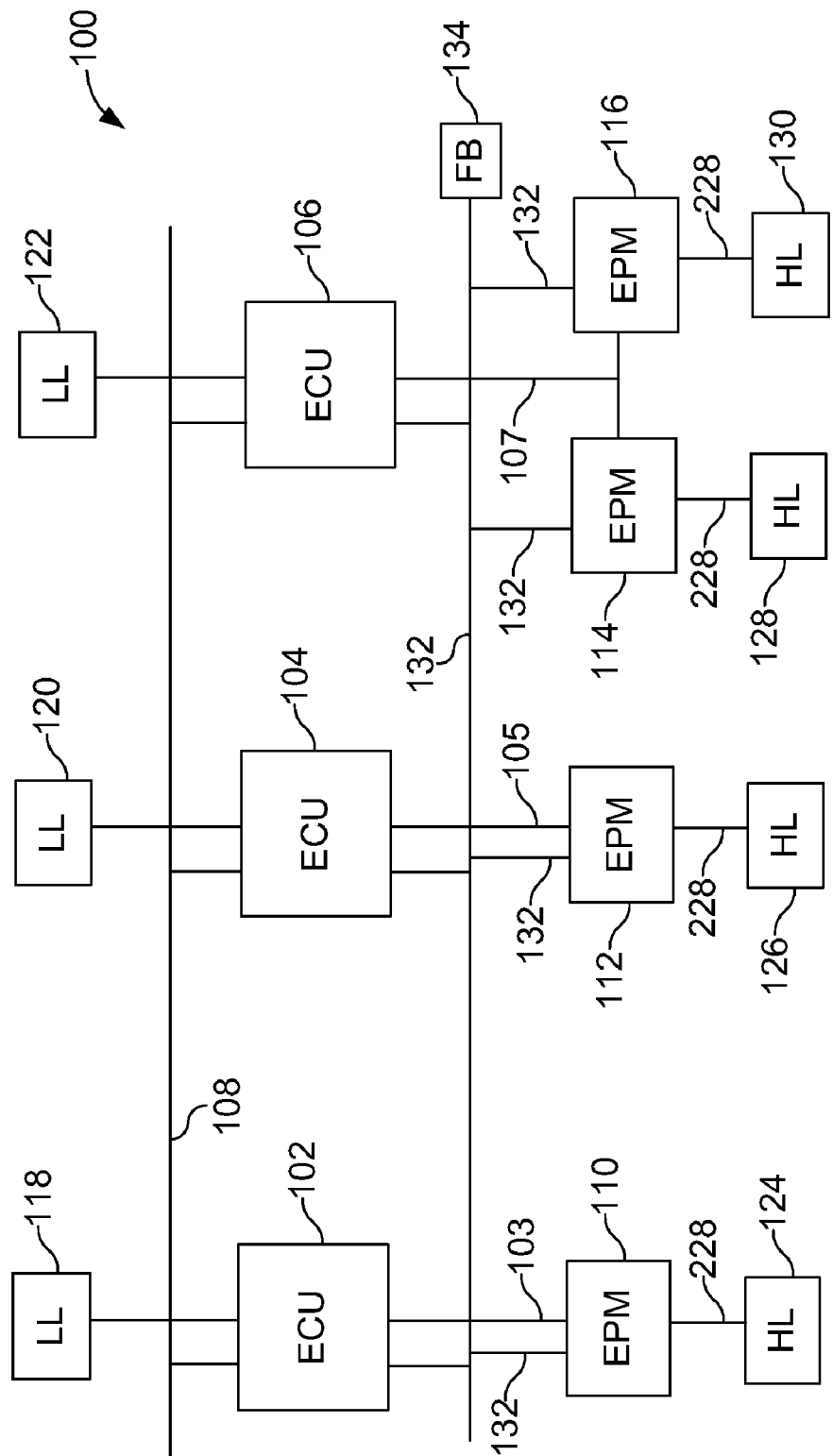
FIG. 1 is a schematic view of an embodiment of a vehicle communications and power network of the present invention having a plurality of electronic control units (ECUs) and a plurality of microcontroller-based electronic power modules (EPMs)

Referring now to FIG. 1, there is shown a communications and power network 100 for a work vehicle is provided. The network includes a plurality of digital microprocessor based electronic control units (ECUs) 102, 104 and 106, that are coupled together over a CAN bus 108, a plurality of electronic power modules (EPMs) 110, 112, 114, 116, a plurality of light loads 118, 120 and 122, and a plurality of heavy loads 124, 126, 128 and 130.

Each ECU 102, 104 and 106 is coupled to a corresponding plurality of light loads 118, 120 and 122. Each ECU 102, 104 and 106 is coupled to at least one corresponding EPM 110, 112, 114 and 116 over a private CAN bus. Each EPM 110, 112, 114 and 116 is coupled to a corresponding plurality of heavy loads 124, 126, 128 or 130.

ECUs 102, 104 and 106 are coupled together over CAN bus 108. They and EPMs 110, 112, 114 and 116 receive their power over fused power lines 132 that extend from a fusebox 134 to each ECUs 102, 104 and 106, and EPMs 110, 112, 114 and 116.

Each ECU 102, 104 and 106 is a digital microprocessor/microcontroller-based device having a CPU, a RAM, a ROM, light load driver circuits, a public CAN bus communication circuit (for communicating with the other ECUs over CAN bus 108), and a private CAN bus communication circuit for communicating with the one or more EPMs coupled to that ECU.

ECU 102 is coupled to EPM 110 over private CAN bus 103. ECU 104 is coupled to EPM 112 over private CAN bus 105. ECU 106 is coupled to EPMs 114 and 116 over private CAN bus 107.

ECUs 102, 104 and 106 are programmed to configure their associated EPMs 110, 112, 114 and 116 to configure the EPM's internal connections, to program the EPM's with specific load limits that are monitored and controlled by the EPMs, and to control the heavy load drivers in the EPMs, as well as to perform other functions to control and operate the vehicle in response to user inputs.

ECUs 102, 104 and 106 include internal driver circuits for several light loads 118, 120 and 122, respectively. Light loads 118, 120 and 122 include such devices as switches, sensors, and pilot lights. ECUs 102, 104 and 106 control these loads under program control, the program being stored in the ROM of each ECU.

Each EPM 110, 112, 114 and 116 is coupled to and drives a corresponding plurality of heavy loads 124, 126, 128 and 130. These loads include devices that typically draw between 1 and 40 amperes, such as motors, driving lights, valves, fans and the like.

Each EPM 110, 112, 114 and 116 can be connected to up to 5 individual 30 ampere power feeds 132.

Each EPM 110, 112, 114 and 116 is configured to sense both the input power and output load currents for all of its input power lines and its output load lines and to compare these limits with specific individual and collective current limits and to limit the current to those levels automatically when the currents exceed these individual and collective current levels. These current limits are transmitted to EPM 110, 112, 114 and 116 by the associated ECU 102, 104 and 106.

Private CAN buses 103, 105 and 107 are provided to permit each ECU 102, 104 and 106 to (1) program or configure its associated EPMs 110, 112, 114 and 116 (2) transmit power commands, and (3) receive status and fault information from its associated EPM 110, 112, 114 and 116 by transmitting and receiving several different types of CAN bus messages containing configuration and status information.

EPMs 110, 112, 114 and 116 are configured to be interchangeable. Thus, in the vehicle network shown in FIG. 1, any EPM 110, 112, 114 or 116 may be exchanged for any other EPM 110, 112, 114 or 116 and will function the same in its new position as the EPM it replaced. It can do this even though high loads 124, 126, 128 and 130 in its new position are different not only in magnitude (i.e. current limits) but also in type (i.e. high, low, or "H"-bridge).

To provide this capability, every EPM 110, 112, 114 and 116 on the wiring harness and CAN buses is a direct plug-in replacement for any other EPM 110, 112, 114 and 116. Every EPM 110, 112, 114 and 116 has the same connectors with the same pins in the same locations on the EPM housing as every other EPM 110, 112, 114 and 116. Each EPM 110, 112, 114 and 116 is configured to handle its different loads They are each configured by their associated ECU 102, 104 and 106 to perform their assigned tasks and handle different loads.

One advantage of this identical EPM construction is the ease with which broken EPMs can be identified and replaced. It is also advantageous to the manufacturer of the vehicle in which the EPMs are mounted since (in the illustrated system of FIG. 1, for example) instead of having four different EPMs as spares, the vehicle operator need only keep a single EPM and this single spare EPM can be substituted for any of EPMs 110, 112, 114 and 116. Furthermore, in case of an EPM breakdown in the field, the operator can exchange a broken (but critical) EPM for a functioning (but non-critical) EPM, thereby shutting down the non-critical functions of the working EPM and providing the functions of the broken EPM. This can permit him to either continue his field work or quit working in the field and drive the vehicle back to the farm buildings for servicing.

Figure 2:
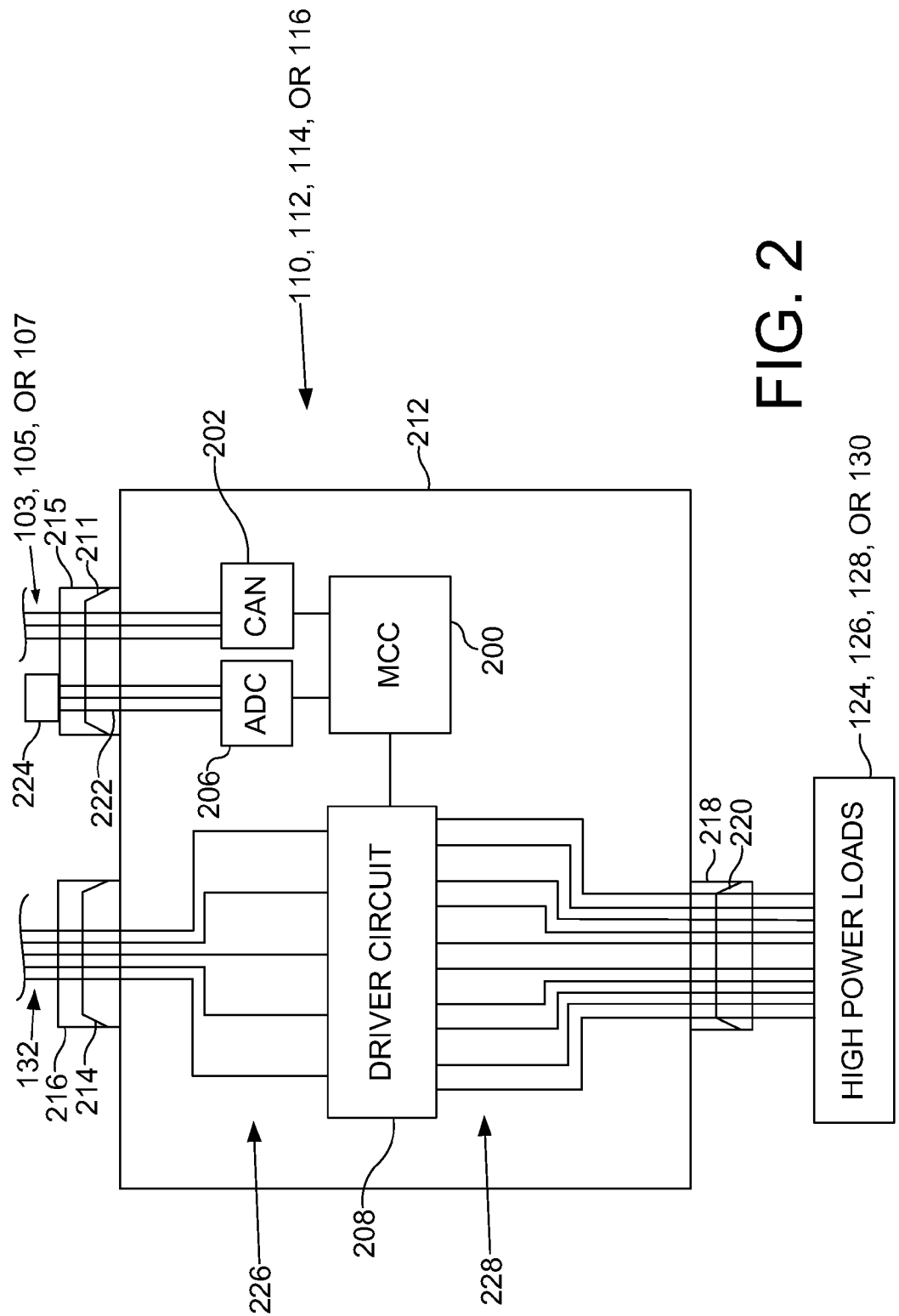
FIG. 2 is a schematic view of the EPMs of FIG. 1, showing their internal configuration.

Now, additionally referring to FIG. 2 illustrates the internal configuration of EPMs 110, 112, 114 and 116 in FIG. 1 and details regarding their connections to the rest of network 100 (FIG. 1).

Each EPM 110, 112, 114 and 116 includes a digital microcontroller circuit (MCC) 200 that includes a RAM circuit, a ROM circuit, and a CPU circuit. MCC 200 is coupled to its private CAN bus communications circuit 202, an address decoder circuit (ADC) 206, and a driver circuit 208. The MCC ROM circuit stores digital instructions executed by the CPU circuit to provide the EPM capabilities (described in more detail below). The MCC RAM circuit includes storage space for working data used by the CPU circuit when executing the digital instructions of the ROM circuit.

The FIG. 2 circuitry is mounted on one or more circuit boards that are disposed in a light metal housing 212. It has one or more multipin connectors 214, 211 or 218 fixed to housing 212 that permit EPM 110, 112, 114 and 116 to be electrically coupled to other components in the network 100 (FIG. 1). Connectors 214, 211 and 218 are coupled to corresponding mating multipin connectors 216, 215 or 220 that extend from the vehicle's wiring harness. While the embodiment shown herein has three connectors, it may alternatively have 1, 2, 4 or more connectors.

In the present embodiment, connector 214 is coupled to wiring harness connector 216, which is connected to fused power lines 132. Fused power lines 132 going to each EPM 110, 112, 114 and 116 include five input power lines 226 going to each EPM 110, 112, 114 and 116. Output connector 218 is connected to output connector 220 which is a part of the wiring harness of the vehicle. Connector 220 is connected to heavy loads 124, 126, 128 or 130 that the EPM drives. The EPM has several address pins 222 in connector 211 that are coupled to an address circuit 224 in connector 215. The function of these address pins 222 is to indicate to the EPM what the EPM's address is on the private CAN bus. This feature permits EPM's 114 and 116 to receive specific individual CAN messages sent to them by ECU 106. EPM 110, 112, 114 and 116 determine their address automatically whenever connectors 214 or 215 are coupled together by scanning address pins 222, which receive specific address signals from address circuit 224. Alternatively, connectors 218 or 220 may be provided with an intergral address circuit 224. As another alternative, EPM 110, 112, 114 and 116 could be provided with one or more address switches such as DIP switches that are coupled to address lines 222 instead of providing an address circuit 224 on a connector. In this arrangement, the operator would manipulate the switches manually to select the EPM's proper address.

Driver circuit 208 includes subcircuits that can selectively connect each of five input power lines 226 to ten output load lines 228, which in turn are connected to loads 124, 126, 128, or 130. Driver circuit 208 is further configured to selectively monitor the current and voltage on input power lines 226 and on output load lines 228.

Driver circuit 208 is coupled to and configured by MCC 200. MCC 200 configures and controls circuit 208 to couple specific ones of input power lines 226 to specific ones of the output load lines 228, and to set the appropriate drive levels for high power loads 124, 126, 128 and 130.

MCC 200 stores digital instructions in its ROM circuit that operate the EPM. MCC 200 instructions configure the MCC to perform several functions, including receiving ECU CAN bus messages, configuring itself in response to these messages, and transmitting status messages back to ECU that indicate the status of the EPM.

MCC 200 configures driver circuit 208 to make output load lines 228 function as H-bridge outputs, high side outputs, and low side outputs. MCC 200 also configures driver circuit 208 to configure the individual output load lines 228 to function as on/off outputs, frequency modulated outputs or pulse-width modulated (PWM) outputs. MCC 200 also configures driver circuit 208 to sense the current in each of input power lines 226 and output load lines 228, to communicate the currents to the EPM, and to automatically and selectively disconnect specific input power lines 226 from specific output load lines 228 when the specific current limits (saved in the MCC's ROM or RAM memory) are exceeded.

MCC 200 includes digital instructions to read the address indicated by the signals on address pins 222. MCC 200 then automatically configures CAN circuit 202 to respond to CAN data packets sent to that address. Once the CAN communications circuit is configured, MCC 200 receives the configuration instructions for driver circuit 208 and configures it accordingly.

Some, but not all, of the particular messages sent between the ECU and the EPM include Driver Configuration Messages (DCM), Driver Request Messages (DRM), Unit Configuration Messages (UCM), Power Module Status Messages (PMSM) and Output Driver Status Messages (ODSM).

The ROM circuit of MCC 200 includes instructions that configure MCC 200 to receive CAN bus data packets from the associated ECU and to automatically configure driver circuit 208 in response. These data packets are called Driver Configuration Messages (DCM).

The ROM circuit of MCC 200 also includes instructions that configure MCC 200 to receive CAN bus data packets from the associated ECU requesting the status of the EPM. These data packets are called Driver Request Messages (DRM).

The ROM circuit of MCC 200 also includes instructions that configure MCC 200 to receive CAN bus data packets from the associated ECU and to automatically configure driver circuit 208 in response. These data packets are called Unit Configuration Messages (UCM).

The ROM circuit of MCC 200 also includes instructions that configure MCC 200 to transmit CAN bus data packets to the associated ECU indicating the status of the EPM. These data packets are called Power Module Status Messages (PMSM) and Output Driver Status Messages (ODSM).

The Driver Configuration Message (DCM) is a 64 bit message that includes the parameters in the following paragraphs. When the MCC receives this message, it configures itself to provide the requested functions.

(1) A driver mask, indicates the particular driver 208 subcircuit that the MCC should configure, as described below in paragraphs (2) through (9). There are ten driver subcircuits in driver circuit 208 that can be independently, selectively and sequentially configured using a series of DCMs.

(2) An output configuration, which tells the MCC to configure the driver subcircuit, identified in the driver mask, as a high side or a low side driver.

(3) A fault response parameter which tells the MCC to configure the driver subcircuit identified in the driver mask to turn off under certain fault conditions, including when the driver is open circuited, when the driver is short circuited, when the total EPM current exceeds a predetermined level, when the driver's power feed is unavailable to the driver, when the driver is stuck "on", when the driver is stuck "off", or when the driver is shorted "high".

(4) The driver output mode—which tells the MCC to turn the driver subcircuit, identified in the driver mask, "off", "on", or "on" with the pulse width modulated (PWM) characteristics provided below, and whether the MCC should measure the back EMF across the driver's load during the PWM mode.

(5) The frequency of the output in PWM mode, which tells the MCC to configure the driver subcircuit identified in the driver mask to have a PWM frequency of 250 Hz or 20 kHz.

(6) The duty cycle of the PWM output, which tells the MCC to configure the driver subcircuit, identified in the driver mask, to PWM at a particular PWM duty cycle.

(7) The repetition rate of the status message, which tells the MCC how often it should transmit the status of the driver subcircuit, identified in the driver mask, on the private CAN bus to the ECU.

(8) Open circuit detection, which tells the MCC whether it should detect an open circuit condition on the driver subcircuit, identified in the driver mask.

(9) The short circuit threshold, which tells the MCC the current level through the driver subcircuit, identified in the driver mask, at which the MCC should respond to a short circuit, either by (a) shutting the driver down, and (b) sending a status message to the ECU indicating an overcurrent, or both.

The Driver Request Message (DRM) is a 32 bit message which tells the MCC, which of all of its previously configured drivers should be turned "off" and which of its previously configured drivers should be turned "on". When the MCC receives this message it responsively turns the corresponding drivers "on" or "off".

The Unit Configuration Message (UCM) is a 64 bit message, which tells the MCC to configure itself to provide the requested functions. The functions include an overcurrent setting for each of the five input power lines 226. The EPM uses this setting to determine if an over current condition occurs. The UCM indicates the threshold current value for each of the input power lines that MCC 200 shall consider an overcurrent condition for that power line.

The Power Module Status Message (PMS) is a 64 bit message that is transmitted from the EPM back to the ECU over the private CAN bus. The PMS indicates the status of various operating parameters for the EPM as a unit. These include (1) the voltage on each of the five input power lines 226 and (2) the total electrical current consumption of the EPM.

The Output Driver Status Message (ODSM) is a 64 bit message that is transmitted from the EPM back to the ECU over the private CAN bus to indicate the status of the various operating parameters for each of the ten output load lines 228. The message includes (1) whether the driver status is (a) hard "on" (on with a 100% duty cycle), (b) hard "off" (off with a 100% duty cycle), or (c) "on" with a non-zero frequency. (2) whether the logic level of the output of the driver is "off" (has a low logic level), or "on" (has a high logic level), (3) a description of the last driver fault detected, including (a) whether no fault is detected, (b) whether an open circuit on the driver is detected, (c) whether a short circuit on the driver is detected, or whether the EPM has turned the driver off because it detected an EPM overcurrent condition, (d) whether the power feed is unavailable for that driver, (e) whether there has been a CAN bus transmission error, (f) whether the driver is stuck "on" (this occurs when the ECU has commanded the EPM to turn a driver "off" yet the current through the driver, as measured by the EPM, is greater than a predetermined minimum current), (4) the output current of the driver, (5) the back voltage or EMF of a driver configured as an "H" bridge.

Figure 3:
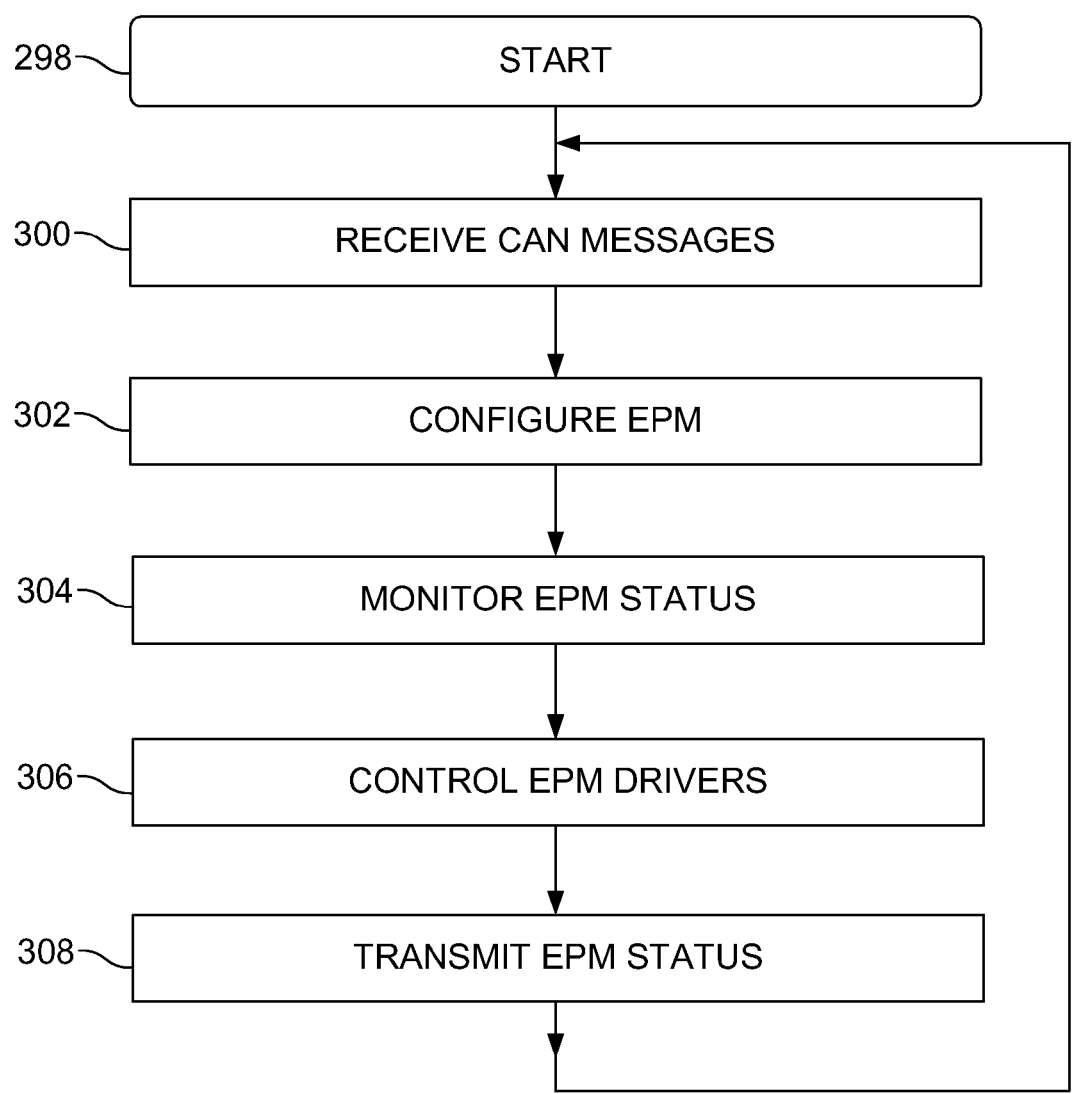
FIG. 3 is a flow chart of the programmed operation of the EPM's of FIGS. 1 and 2.

Now additionally referring to FIG. 3 there is illustrated a simplified flowchart of EPM operation.

In step 298 the process starts and the EPM is initially energized. This typically happens when the agricultural vehicle, in which the communications and power network 100 are associated, is started. The EPM reads the address using a previously described technique.

In step 300, the EPM receives the DCM, DRM, and UCM messages (described above) transmitted from the ECU to the EPM.

In step 302, the EPM processes the DCM and configures itself accordingly, configuring each driver as a high side, low side or "H" bridge driver, configuring each driver as an "on/off driver or a PWM driver, configuring the PWM frequency and duty cycle, configuring the rate at which the EPM will transmit each driver's status messages, configuring the EPM to check for open circuit conditions on the driver, short circuit conditions of the driver, and configuring the short circuit current threshold at which the EPM will automatically shut off that driver and notify the ECU, among others.

In response to the DRM, the EPM turns the indicated drivers "on" or "off" in accordance with the driver configuration provided by the DCM message.

In response to the UCM, the EPM configures the overcurrent limits for each of the five input power lines 226. The overcurrent limits are the maximum current the EPM will conduct through each input power line before the EPM automatically shuts off the drivers that are powered by that input power line.

In step 304, the EPM monitors its status in accordance with the configuration received in step 300. It checks the current and voltage levels of the input power lines and the output load lines to determine whether a short circuit or open circuit exists, whether there is power available on each input power line and whether a driver is stuck on. The latter is indicated when a driver is commanded "off" but a voltage and/or current is sensed on the output load lines.

In step 306 the EPM controls its drivers in accordance with configuration instructions received in step 300. The EPM turns the drivers on or off as indicated by the DRM.

In step 308 the EPM transmits its status to the ECU. The status messages include the PMS and the ODS described above. Once the status messages are transmitted, the EPM loops back to step 300 where it repeats the process. These steps are repeated periodically for as long as power is supplied to the EPM—typically as long as the agricultural vehicle is running.

For convenience of illustration, steps 300-308 have been described as a linear sequence of events. However, each step 300-308 need not follow from the step immediately preceding step in a linear fashion. The various steps may be interrupt driven. They may occur at irregular intervals and even in a different order than that shown in FIG. 3.

Having described the preferred embodiment, it will become apparent that various modifications can be made without departing from the scope of the invention as defined in the accompanying claims.

The invention claimed is:

1. An electronic power module (EPM) for an agricultural vehicle having a controller area network (CAN) bus network, wherein the CAN bus network includes a plurality of electronic control unit (ECU)s and a plurality of EPMs, wherein each of the EPMs is coupled to a corresponding ECU of the plurality of ECUs to be controlled thereby, each EPM comprising:

a housing;
at least one multipin connector on said housing; and
an EPM circuit disposed in said housing, said EPM circuit electrically coupled to said at least one multipin connector, said EPM circuit including:
at least one microcontroller;
a driver circuit coupled to said at least one microcontroller, said driver circuit being configured by said at least one microcontroller, said driver circuit having a plurality of driver subcircuits; and
a CAN bus communication circuit coupled to said at least one microcontroller configured to receive CAN bus messages, said CAN bus messages each including driver configuration instructions and driver current limits from a corresponding ECU and instructions to said at least one microcontroller, said at least one microcontroller being configured to receive said driver configuration instructions from said CAN bus communications circuit and to responsively configure said driver subcircuits according to said driver configuration instructions.

2. The electronic power module of claim 1, wherein said at least one microcontroller is configured to receive said CAN bus messages from said CAN bus communications circuit, said CAN bus messages including instructions to selectively and independently configure each of said plurality of driver subcircuits as one of an H-bridge, a current sourcing and a current sinking output, said at least one microcontroller being further configured to configure each of said plurality of driver subcircuits according to said instructions.

3. The electronic power module of claim 1, wherein said at least one microcontroller is configured to receive said CAN bus messages from a corresponding one of said plurality of ECUs, said CAN bus messages including current limits for each of said driver subcircuits, said at least one microcontroller being further configured to monitor each of said driver subcircuits to determine whether each of said driver subcircuits has exceeded an associated one of said current limits, and to responsively shut any of said driver subcircuits down when said current limit associated with corresponding ones of said driver subcircuits is exceeded.

4. The electronic power module of claim 1, wherein said at least one multipin connector includes a plurality of address pins that are configured to automatically indicate a CAN bus address to said EPM circuit when said multipin connector is plugged into a vehicle wiring harness of the agricultural vehicle.

5. The electronic power module of claim 1, wherein said at least one microcontroller is configured to receive said CAN bus messages from said CAN bus communications circuit, said CAN bus messages including a total current limit for a sum of individual currents passing through said plurality of driver subcircuits, said at least one microcontroller being further configured to monitor said plurality of driver subcircuits to determine whether a total current of said plurality of driver subcircuits exceeds said total current limit and responsively shut said plurality of driver subcircuits down when said total current limit is exceeded.

6. The electronic power module of claim 1, wherein said at least one microcontroller is configured to receive said CAN bus messages including instructions to configure a first subcircuit of said plurality of driver subcircuits as a pulse width modulated circuit, to configure the frequency at which said first subcircuit is modulated, and to configure a pulse width modulated duty cycle of said first subcircuit.

7. A controller area network (CAN) bus network for an agricultural vehicle, comprising:
a plurality of electronic control units (ECUs) coupled to a CAN bus;
a plurality of electronic power modules (EPMs), wherein each of said EPMs is coupled to a corresponding ECU of said plurality of ECUs to be controlled thereby, each EPM of said plurality of EPMs including:
a housing;
at least one multipin connector on said housing; and
an EPM circuit disposed in said housing, said EPM circuit including
at least one microcontroller;
a driver circuit coupled to said at least one microcontroller to be configured thereby, said driver circuit having a plurality of driver subcircuits; and
a CAN bus communication circuit coupled to said at least one microcontroller to receive CAN bus messages that include driver configuration instructions and driver current limits from said corresponding ECU, said at least one microcontroller being configured to receive said driver configuration instructions from said CAN bus communications circuit and to responsively configure said driver subcircuits according to said driver configuration instructions.

8. The CAN bus network of claim 7, wherein said at least one microcontroller is configured to receive said CAN bus messages from said CAN bus communications circuit including instructions to selectively and independently configure each of said plurality of driver subcircuits as one of an H-bridge, a current sourcing and a current sinking outputs, said at least one microcontroller being further configured to configure each of said plurality of driver subcircuits according to said instructions.

9. The CAN bus network of claim 7, wherein said at least one microcontroller is configured to receive said CAN bus messages from said corresponding ECU including current limits for each of said driver subcircuits, said at least one microcontroller being further configured to monitor each of said driver subcircuits to determine whether any of said driver subcircuits has exceeded said current limit associated with each of said driver subcircuits and to responsively shut each of said driver subcircuits off which has exceeded said current limit associated with each corresponding one of said driver subcircuits.

10. The CAN bus network of claim 7, wherein said at least one multipin connector includes a plurality of address pins that are configured to automatically indicate a CAN bus address to said EPM circuit when said multipin connector is plugged into a vehicle wiring harness of the agricultural vehicle.

11. The CAN bus network of claim 7, wherein said at least one microcontroller is configured to receive said CAN bus messages from said CAN bus communications circuit including a total current limit for a sum of individual currents passing through said plurality of driver subcircuits, said at least one microcontroller being further configured to monitor said plurality of driver subcircuits to determine whether said total current of said plurality of driver subcircuits exceeds said total current limit and to responsively shut said plurality of driver subcircuits down when said total current exceeds said total current limit.

12. The CAN bus network of claim 7, wherein said at least one microcontroller is configured to receive CAN bus messages including instructions to configure a first subcircuit of said plurality of driver subcircuits as a pulse width modulated circuit, to configure a frequency at which said first subcircuit shall be modulated, and to configure a pulse width modulated duty cycle of said first subcircuit.

\* \* \* \* \*